(12) United States Patent
Savo et al.

(10) Patent No.: US 6,523,057 B1
(45) Date of Patent: Feb. 18, 2003

(54) HIGH-SPEED DIGITAL ACCUMULATOR WITH WIDE DYNAMIC RANGE

(75) Inventors: Pierandrea Savo, Pavia (IT); Luigi Zangrandi, Pavia (IT); Stefano Marchese, Pavia (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/307,083

(22) Filed: May 7, 1999

(30) Foreign Application Priority Data

May 8, 1998 (EP) ............................. 98830278

(51) Int. Cl.[7] ............................................. G06F 7/50
(52) U.S. Cl. ....................... 708/706; 708/513
(58) Field of Search ................. 708/706, 700, 708/513

(56) References Cited

U.S. PATENT DOCUMENTS

| | | | | |
|---|---|---|---|---|
| 5,367,691 A | | 11/1994 | Johnson | 395/800 |
| 5,699,279 A | * | 12/1997 | Widigen et al. | 708/518 |
| 5,757,685 A | * | 5/1998 | Ohuchi | 708/518 |

FOREIGN PATENT DOCUMENTS

| | | |
|---|---|---|
| JP | 61214026 | 9/1986 |
| JP | 61250733 | 11/1986 |
| JP | 62027864 | 2/1987 |

OTHER PUBLICATIONS

Croisier, "Accumulator For A Delta Transversal Filter," *IBM Technical Disclosure Bulletin*, 14:10, Mar. 1972.

Kirchner et al., "Accurate Arithmetic for Vector Processors," *Journal of Parallel and Distributed Computing*, No. 3, pp. 250–270, Jun. 1998.

* cited by examiner

Primary Examiner—David H. Malzahn
(74) Attorney, Agent, or Firm—Lisa K. Jorgenson; Robert Iannucci; Seed IP Law Group PLLC

(57) ABSTRACT

A high-speed, wide dynamic range, digital accumulator includes a first adder stage in which an input addend is added to a value of a least significant part of an output of an accumulator from a preceding clock period. The accumulator also includes at least one second stage having incrementer/decrementer means for performing an increment, decrement or identity operation on a most significant part of the output of the accumulator. The incrementer/decrementer means includes logic means for triggering the increment, a decrement or identity operation on the most significant part of the accumulator output based on a decision made on results obtained at the previous clock period.

5 Claims, 1 Drawing Sheet

HIGH-SPEED DIGITAL ACCUMULATOR WITH WIDE DYNAMIC RANGE

TECHNICAL FIELD

The present invention relates to a high-speed digital accumulator with wide dynamic range. More particularly, the invention relates to a high-speed digital accumulator with wide dynamic range which uses a twos-complement digital adder.

BACKGROUND OF THE INVENTION

It is known that digital accumulators consist of an adder which receives an input and the value of the accumulator itself in the preceding time period. In practice, the transfer function of said digital accumulators in Z-transforms is as follows:

$$Y = \frac{z}{z-1} \cdot X$$

FIG. 1 illustrates a digital accumulator executed according to the prior art.

As shown in FIG. 1, the accumulator thus comprises a digital adder 1, the input whereof receives an addend X which is m bits long and also receives the value of the accumulator during the preceding clock period; said value has a length of n bits, since the adder is an n-bit adder. In this case, the output datum Y has a length of n bits.

The reference numeral 2 designates an accumulation register for the result of the adder 1.

In this structure it is assumed that n is much larger than m.

The above-described structure has the drawback that it is inherently slow, since the sum performed by the adder 1 must be completed in a time which is short enough to satisfy the following relation:

$$T_{sum(n)} + T_{setup} < T_{clock}$$

The pass time of the n-bit adder 1 added to the setup time of the bank of the register 2 must be shorter than the clock time with which the structure is supplied.

Accordingly, it is sometimes difficult to satisfy the above relation, especially in high-speed applications, where it is not possible to use simple ripple-carry adders and therefore structures of the look-ahead or carry select type are used, always with the ultimate goal of satisfying the above equation.

SUMMARY OF THE INVENTION

The aim of an embodiment of the present invention is therefore to provide a high-speed digital accumulator with wide dynamic range which has a very large number of significant digits with respect to the operating frequency.

Within the scope of this aim, an advantage of an embodiment of the present invention is to provide a high-speed digital accumulator with wide dynamic range which allows to perform the operation of a digital accumulator in at least two clock cycles by means of a pipeline.

Another advantage of an embodiment of the present invention is to provide a high-speed digital accumulator with wide dynamic range which uses a high-speed, reduced-area twos-complement digital adder.

Another advantage of an embodiment of the present invention is to provide a high-speed digital accumulator with wide dynamic range which is highly reliable, relatively easy to manufacture and at competitive costs.

This aim, these advantages and others which will become apparent hereinafter are achieved by an embodiment of a high-speed digital accumulator with wide dynamic range, characterized in that it comprises a first adder stage, in which an input addend is added to a value of a least significant part of an accumulator at the preceding clock period, and at least one second stage, which comprises incrementer/decrementer means suitable to perform an increment, decrement or identity operation on a most significant part of said accumulator, said incrementer/decrementer means further comprising logic means suitable to trigger an increment, a decrement or an identity of said most significant part on the basis of a decision made on results obtained at the preceding clock period.

Further characteristics and advantages of the invention will become apparent from the description of embodiments of the digital accumulator according to the invention, illustrated only by way of non-limitative example in the accompanying drawings.

DETAILED DESCRIPTION OF THE ILLUSTRATED EMBODIMENTS

Figure 1:
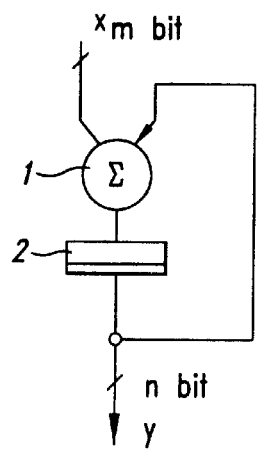
FIG. 1 is a block diagram of a conventional digital accumulator.

FIG. 1 was described earlier and therefore is not described further in this part of the description.

Figure 2:
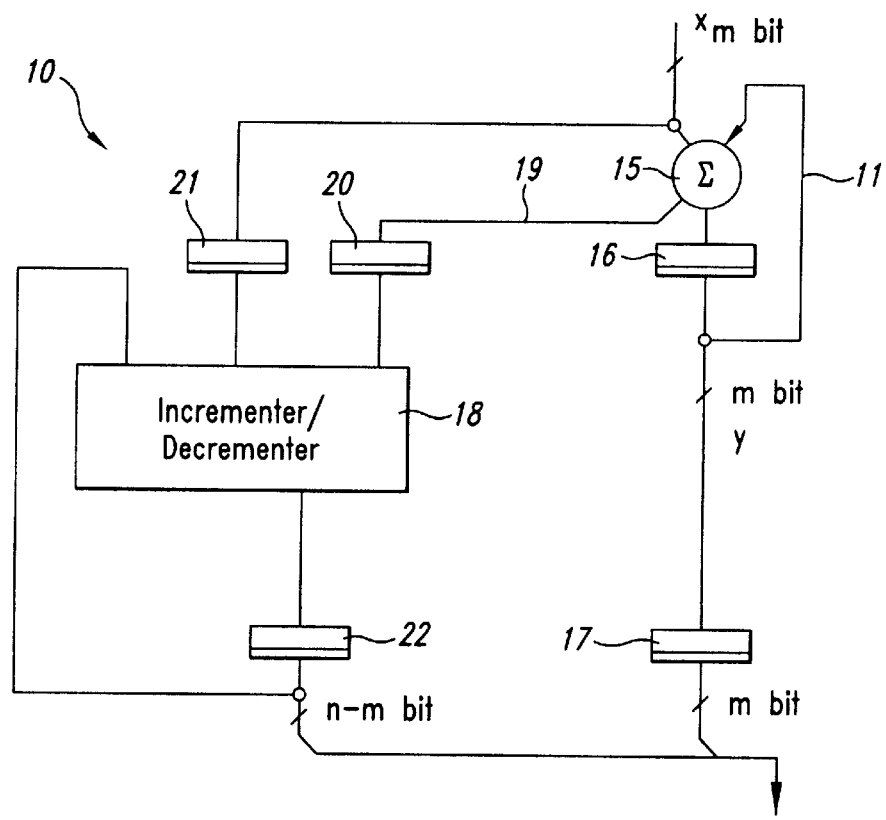
FIG. 2 is a block diagram of a digital accumulator executed according to an embodiment of the present invention.

Accordingly with reference to FIG. 2, the digital accumulator according to an embodiment of the present invention, generally designated by the reference numeral 10, comprises a digital adder 15 which receives in input an m-bit addend X and the output 11 of the adder, i.e., the value of the accumulator at the preceding time period, which is m bits long. A register 16 accumulates the result of the adder 15 and a register 17 accumulates in each instance the m bits in output from the digital adder 15.

The output of the register 17 is therefore again m bits long.

The second stage of the structure of FIG. 2 provides for an increment, decrement or identity operation performed in incrementer/decrementer means 18 which receive in input the sign of the addend X, i.e., one bit; the incrementer/decrementer means 18 receive in input the overflow 19 in output from the adder 15, acquired at the preceding time period, and the most significant part of the accumulator $Y_1$ acquired at the preceding period.

The incrementer/decrementer means 18 contain a truth table, on the basis of which a decision is made to perform an increment, a decrement or an identity on the most significant part $Y_1$ of the accumulator. The decision is made on the basis of the results of the preceding stage.

Additional registers 20 and 21 are provided to accumulate respectively the overflow 19 and the sign of the addend X.

Finally, a register 22 is provided in order to accumulate the most significant part $Y_1$ of the accumulator. The output of the register 22 has a length of m-n bits, which are combined with the m bits in output from the register 17. Accordingly, the output of the accumulator according to the invention has a total length of n bits.

The truth table contained in the incrementer/decrementer means 18 prescribes that if the sign of the addend X is equal to 1 at the preceding time period and the overflow at the same period is equal to 0, then the most significant part $Y_1$ is decremented by 1; if instead the sign of the addend X at the preceding time is 0 and the overflow 19 at the same period is 1, then the most significant part $Y_1$ is equal to the most significant part $Y_1$ at the preceding period, increased by 1.

If the sign of the addend X at the preceding time period is equal to 1 and the overflow 19 at the same period is 1, then the most significant part $Y_1$ is equal to the most significant part at the preceding period; finally, if the sign of the addend X at the preceding time period is 0 and the overflow 19 calculated at the same period is equal to 0, then the most significant part is equal to the most significant part at the preceding time period.

In this manner, in the first stage of the accumulator according to an embodiment of the invention the input is added to the most significant part of the accumulator, while the second stage merely performs an increment/decrement operation, or neither of these, on the most significant part of the accumulator, on the basis of the outcome of a decision made according to the above-described truth table, in which the results acquired in the preceding stage are entered.

Accordingly, an accumulation with two clock cycles of latency is obtained, but the above-described equation is converted into the following pair of equations, where the addition time, in this case, is equal to the time of the decision made in the incrementer/decrementer means 18 plus the increment/decrement time also provided in the same means 18.

$$T_{sum(m)} + T_{setup} < T_{clock}$$

$$T_{decision} + T_{incdec(n-m)} + T_{setup} < T_{clock}$$

The operation of the accumulator depends only on one of the two preceding equations and particularly on the one that has the biggest first member. Since m is usually much smaller than n, it is possible to substantially increase the clock frequency without reducing the number of significant digits.

In practice it has been observed that the digital accumulator according to an embodiment of the present invention provides the transfer function of a digital accumulator in two or more clock cycles by means of a pipeline.

The accumulator thus conceived is susceptible of numerous modifications and variations, all of which are within the scope of the inventive concept. For example, it is possible to extend the above-described accumulator 10 by increasing the number of stages in the pipeline, allowing the number of bits in the most significant part of the output from the accumulator 10 to be increased without having to reduce the clock frequency. Finally, all the components may be replaced with other technically equivalent components. For example, the accumulator 10 may be implemented through dedicated components, a custom integrated circuit, software programming of a controller or microprocessor, where the software may be stored in any data storage medium or memory device such as a ROM, RAM or on a floppy disk or the equivalent, or through other existing or future developed digital techniques or apparatus. Therefore, the invention is not limited by the above-detailed description. Instead, the scope of the invention is to be determined solely by the following claims, which are to be construed in accordance with the established doctrines of claim interpretation.

What is claimed is:

1. An accumulator comprising:

an adder having a first input coupled to an addend and an output;

a first storage register having an input coupled to said output and an output coupled to a second input to said adder, said first storage register storing an output signal from said adder from a clock cycle preceding a present clock cycle;

a logic circuit including a data input coupled to said first input, an overflow input coupled to an overflow output of said adder and an output, said logic circuit including a memory storing a look-up table for deciding whether to perform an increment, decrement or identity operation on a most significant part of an output signal from said accumulator; and a second storage register having an input coupled to said output of said logic circuit and an output coupled to said accumulator output and to a past data input to said logic circuit;

a third storage register coupled between said data input and said first input, said third storage register storing a most significant portion of said addend;

a fourth storage register coupled between said overflow input of said logic circuit and said overflow output of said adder; and a fifth storage register coupled between said output of said first storage register and said accumulator output, wherein said logic circuit receives a sign bit of said input addend from said third storage register, an overflow bit from said fourth storage register and provides said most significant part of said output signal to said second storage register; said sign bit, said overflow bit and said most significant part being determined during said preceding clock period, a first set of bits from an output of said second storage register being combined with a second set of bits from an output of said fifth storage register being combined to provide an accumulator output signal.

2. The accumulator of claim 1 wherein, when said sign bit of the input addend equals said overflow bit, said lookup table instructs said logic circuit not to change said most significant part from said preceding clock period.

3. The accumulator of claim 1 wherein, when said sign bit of the input addend and said overflow bit have different values, said lookup table instructs said logic circuit to increment said most significant part of said output signal from said preceding clock period by 1 when said overflow bit is logic "1".

4. The accumulator of claim 1 wherein, when said sign bit of the input addend and said overflow bit have different values, said lookup table instructs said logic circuit to decrement said most significant part at the preceding clock period by 1 when said overflow bit is logic "0".

5. The accumulator of claim 1 wherein said first and fifth storage registers are m bits wide, said second and third storage registers are n−m bits wide, said accumulator output is n bits wide and n is much greater than m.

* * * * *